United States Patent [19]

Stephens

[11] 4,285,623
[45] Aug. 25, 1981

[54] COMBINED TRANSPORT AND GATE ASSEMBLY FOR DOCUMENT STORAGE AND RETRIEVAL SYSTEMS

[75] Inventor: Edwin V. Stephens, Los Alamitos, Calif.

[73] Assignee: Infodetics Corporation, Anaheim, Calif.

[21] Appl. No.: 131,076

[22] Filed: Mar. 17, 1980

[51] Int. Cl.³ .............................................. B65G 1/02
[52] U.S. Cl. .................................. 414/278; 198/491; 414/282; 414/564
[58] Field of Search ............... 414/267, 281, 282, 274, 414/275, 278, 280, 564; 198/491, 502, 600

[56] References Cited

U.S. PATENT DOCUMENTS 3,297,379  1/1967  Artaud et al. .................... 414/273 X
3,536,194  10/1970  Novak ............................. 414/282 X Primary Examiner—Robert G. Sheridan
Attorney, Agent, or Firm—Philip M. Hinderstein

[57] ABSTRACT

In a document storage and retrieval system of the type including at least one storage rack having a plurality of individual storage compartments, each of the compartments normally having positioned therein a cartridge holding a plurality of cards or the like, at least a first one of the compartments being empty and functioning as an access port for feeding cartridges into and removing cartridges from the storage rack, and a carriage assembly which travels on one side of the rack for transferring cartridges between the access port and the other storage compartments, the carriage assembly including a transport mechanism for moving cartridges thereon to and thereoff of, there is disclosed an improved transport and gate assembly positionable in a single empty storage compartment immediately below the access port which acts as a stop and cartridge presence sensor for blocking movement of a cartridge through the access port on to or off of the carriage assembly and which selectively retracts and allows movement of a cartridge through the access port between the carriage assembly and a receiving station upon command from a control station.

16 Claims, 10 Drawing Figures

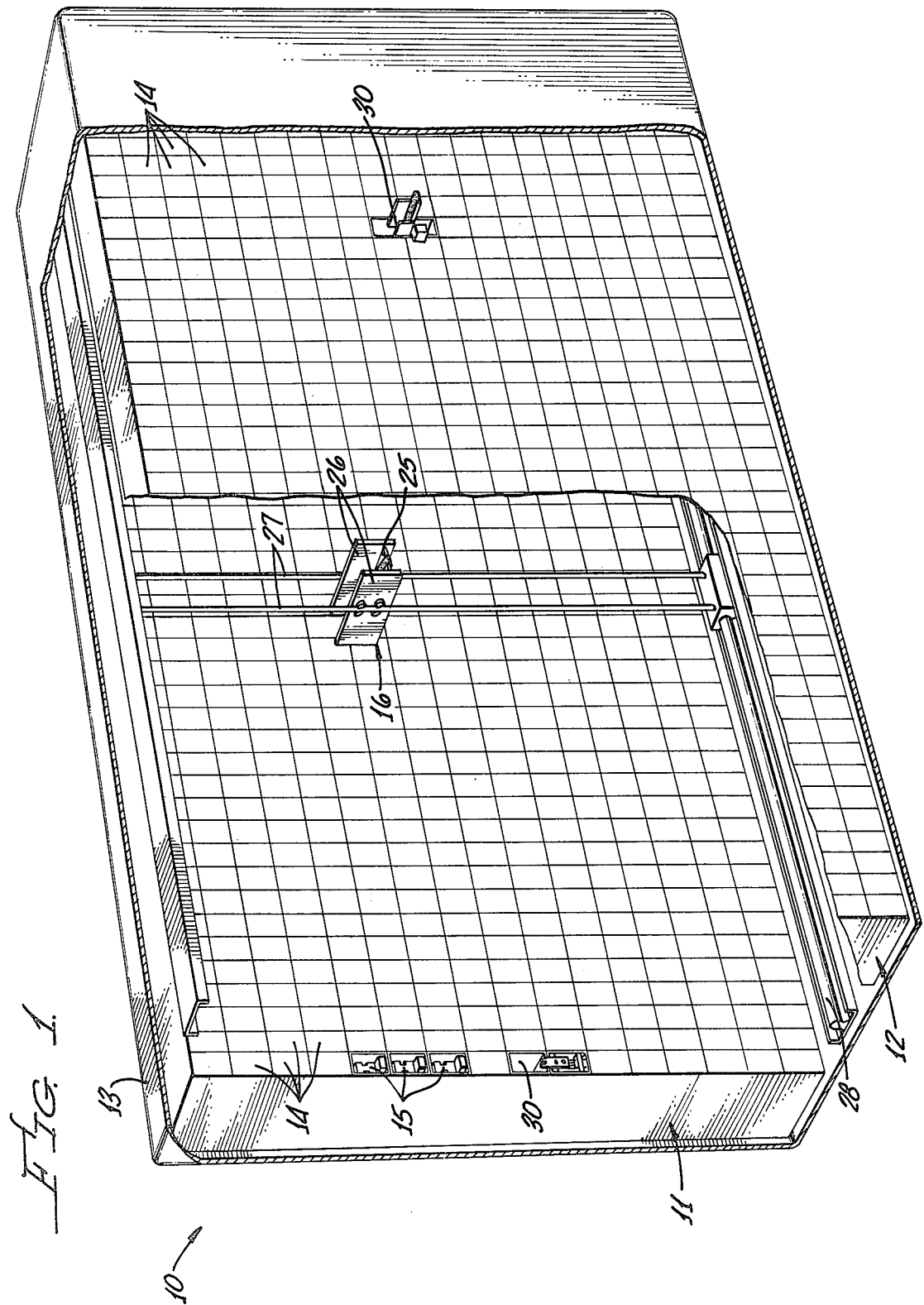

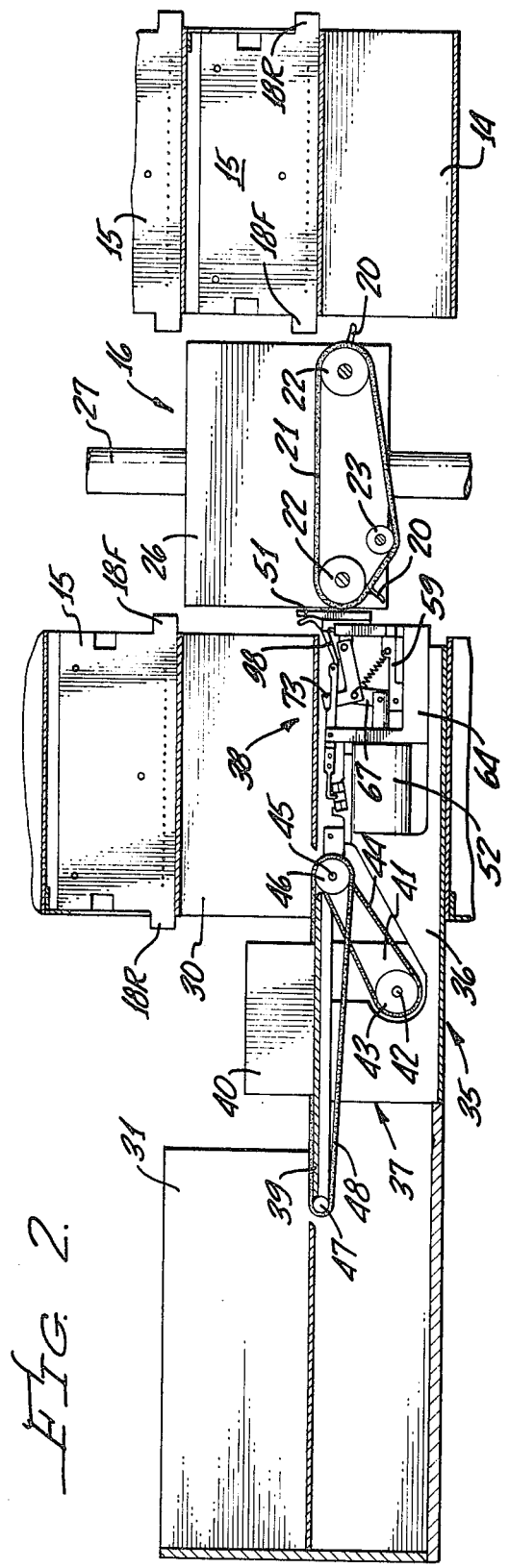
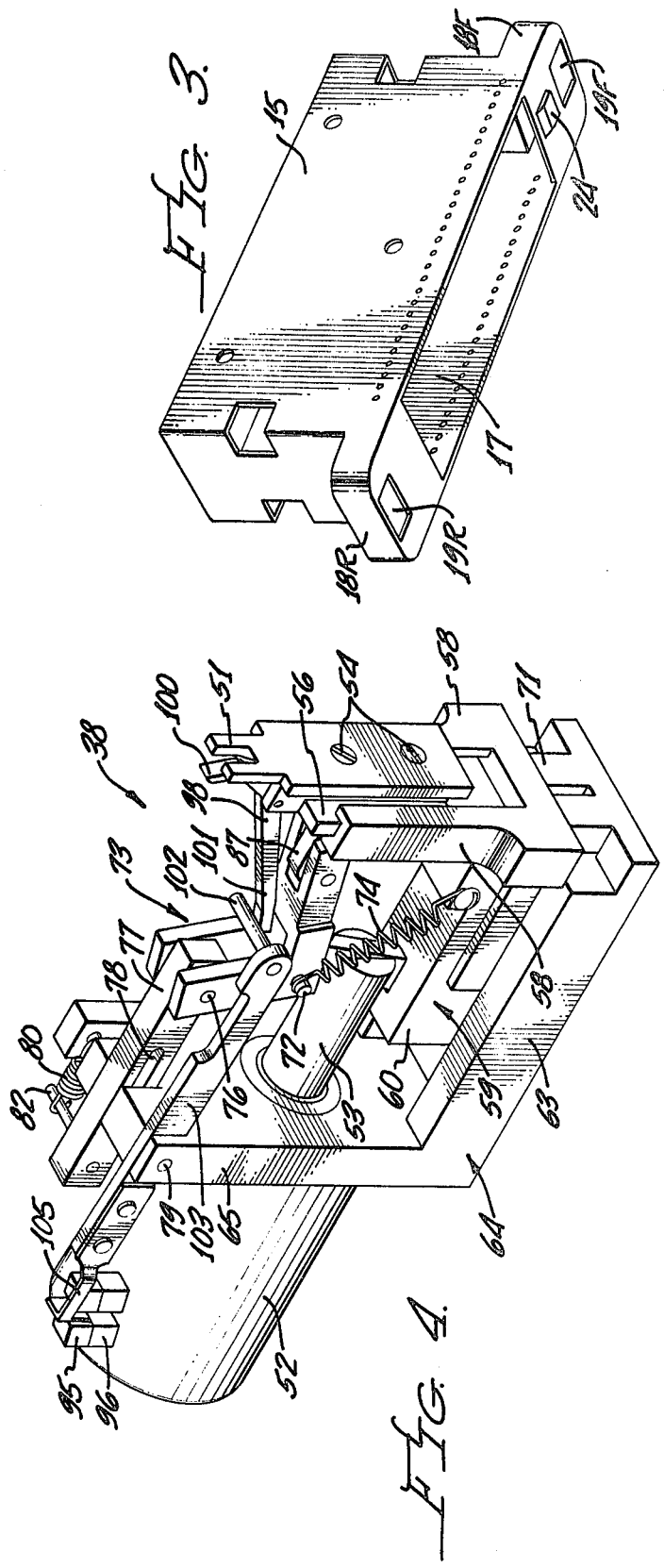

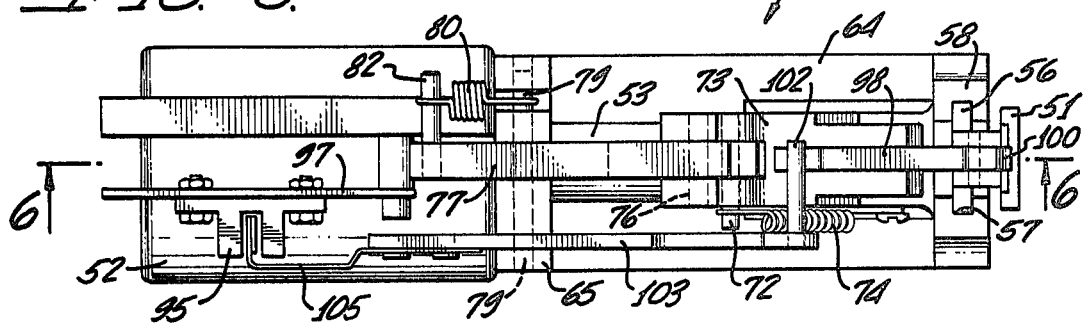

COMBINED TRANSPORT AND GATE ASSEMBLY FOR DOCUMENT STORAGE AND RETRIEVAL SYSTEMS

BACKGROUND OF THE INVENTION

1. Field of the Invention

The present invention relates to a combined transport and gate assembly for a document storage and retrieval system and, more particularly, to a simplified transport and gate assembly which minimizes the number of storage compartments required in a document storage and retrieval system for transferring card holding cartridges from a receiving station into the storage system.

2. Description of the Prior Art

Due to the widespread practice of storing information on cards, as, for example, aperture cards, tabulating cards, microfiches and the like, the principles of the present invention will be described with respect to a storage and retrieval system designed for use with cards. Of course, it is to be understood that although the present invention possesses a high degree of utility in systems in which the storage medium takes the form of a card, the principles of this invention are also applicable to systems in which the documents are of a nature other than cards. For example, it is contemplated that the principles of the present invention may be used in systems in which the documents take the form of ledger sheets, engineering drawings, legal documents, photographs, maps, and the like.

The desirability of mechanizing card storage and retrieval has been appreciated for many years. Mechanization permits cards to be obtained from storage more quickly than is ordinarily possible using conventional, manual retrieval techniques. In addition, with mechanization, the clerical worker is removed from the card retrieval process, eliminating much of the human error normally attendent non-mechanized systems. Consequently, the reliability and accuracy of the retrieval operation is increased while the probability that documents, when returned to the file, are misfiled, preventing their future retrieval, is decreased. Finally, mechanization of the card system, by eliminating the need for the filing clerk, produces long range cost savings as well as a reduction in personnel problems caused by job dissatisfaction typically associated with routine work such as filing.

In order to achieve the advantages of mechanized card storage and retrieval, U.S. Pat. No. 3,536,194, entitled Document Retrieval and Handling System, discloses a system in which documents are randomly stored in containers located at addressable stations, and from which documents are automatically retrievable and returnable, either selectively or in bulk. In such patent, a storage and retrieval system is disclosed having a pair of spaced, parallel storage racks, each having a plurality of individually numbered and addressable storage compartments arranged in a 50 column by 20 row matrix configuration. Normally positioned in each of the numbered storage compartments is a container or cartridge holding up to 100 randomly arranged cards, each of which is code notched along its lower edge to permit digital addressing for selecting a card from a deck of cards stored in the cartridge.

Also included are one or more receiving stations for selective retrieval of cards from a cartridge. Each receiving station is positioned behind the rack in line with an access port which, in practice, is an empty storage compartment. Associated with the storage compartments and the access ports is a carriage assembly which travels in the space between the racks for transferring cartridges between the access ports and the numbered storage compartments. The carriage assembly includes a transport mechanism for moving cartridges between it and any one of the storage compartments.

A cartridge transporting device is also provided for transporting cartridges between the storage compartment used as the access port and the cartridge receiving station. The system further includes a gate assembly which provides a mechanical stop for the cartridge after transit from the receiving station into the access port. The gate includes a sensor which signals the control system that a cartridge has been delivered to the access port for delivery to the carriage assembly.

The present invention is concerned with that portion of the above described document storage and retrieval system responsible for moving cartridges between the receiving station and the carriage assembly. That is, and as described more fully in the above-mentioned patent, in order to conduct a card carrying cartridge into one of the storage racks for storage therein, a transport mechanism is required for moving a cartridge from the receiving station onto the carriage assembly. The physical design of the card storage system necessitates the use of at least one storage compartment to function as an access port. Accordingly, the transport assembly conducts the cartridges from the receiving station into this storage compartment. It has been found necessary to provide a retractable mechanical stop to insure that this transport assembly does not project the cartridge beyond the access port where it might be contacted by and injure the carriage assembly as it moves into position adjacent the access port. It has also been found necessary to provide a sensor for advising the operator that the cartridge is in position in the access port, ready for delivery onto the carriage assembly. With the arrival at the access port of the cartridge carriage, which eventually transports and injects the cartridges into their respective storage compartments, the stop is retracted by its electromechanical mechanism to allow the carriage assembly transport mechanism to pull the cartridge from the access port onto the cartridge carriage.

As stated previously, the physical design of the above-described card storage system necessitates the use of storage compartments for installation of the transport and gate assembly. Therefore, all pockets so used reduce the number of available storage compartments for cartridges and, consequently, the number of cards stored by the possible magnitude of 100 cards per cartridge and 1 cartridge per pocket. This being the case, the number of storage compartments used for the transport and gate mechanism should be minimized. In spite of this, the document retrieval and handling system described in the above-mentioned patent had separate transport and separate gate mechanisms and used 5 pockets for an installation of one access port.

That is, in addition to the access port, the gate mechanism was positioned in the storage compartment immediately thereabove and the connection of the gate mechanism to the storage rack also resulted in use of the storage compartment above it. The transport mechanism was positioned in the storage compartment below the access port, and its mode of connection to the storage rack required use of the storage compartment below it. Thus, each receiving station would require the use of 5 storage compartments, reducing the number of cards that could be stored by 500. Certain system configurations contained as many as 4 receiving stations, requiring 4 access ports, and reducing the number of available storage pockets by 20, corresponding to 2,000 cards. Furthermore, the mechanically actuated electrical switches on the previous gate assembly, which were required to determine the presence of a cartridge in the gate, were extremely delicate and sensitive to switch actuation adjustment.

SUMMARY OF THE INVENTION

According to the present invention, there is described a combined transport and gate assembly for a document storage and retrieval system of the type described above, which solves the problems associated with the separate transport and gate mechanisms previously used. With the present invention, the transport and gate assemblies are integrated into a single unit which is entirely positionable within a single storage compartment, positioned immediately below the access port, thereby reducing the number of storage compartments required for each access port to two, as opposed to five in the previous design. This is accomplished by modifying the transport attachment to the storage pocket structure, thereby eliminating the use of one pocket for attachments, and by designing a new gate mechanism that is incorporated into the transport assembly, thereby eliminating the use of two storage pockets, one for the previous gate assembly and one for the gate assembly attachment. The design integration of the transport and gate mechanisms provides a more reliable and accessible assembly for operation and maintenance. Furthermore, the present transport and gate assembly incorporates photo-optical sensors to determine the presence of a cartridge in the access port, eliminating the delicate adjustments previously required, and providing the inherent reliability of solid state components and circuits.

Briefly, in a document storage and retrieval system of the type including a storage rack having a plurality of individual storage compartments, each of the compartments normally having positioned therein a cartridge holding a plurality of cards or the like, at least a first one of the compartments being empty and functioning as an access port for feeding cartridges into and removing cartridges from the storage rack, and a carriage assembly which travels on one side of the rack for transferring cards between the access port and the other storage compartments, the carriage assembly including a transport mechanism for moving cartridges thereon to and thereoff of, there is disclosed an improved transport and gate assembly positionable in a single second empty storage compartment immediately below the first compartment. The transport and gate assembly includes a generally conventional transport assembly for conveying cartridges from a receiving station into the first storage compartment. The gate assembly portion of the combined assembly comprises a vertically oriented gate extending upwardly from the leading edge of the gate assembly, on the one side of the rack, in front of the first compartment, and positioned to intercept the leading lower edge of a carriage to block movement thereof into or out of the first compartment; a cartridge presence sensor mounted on the gate for providing a signal output indicating that the gate has intercepted a cartridge moving in the first compartment toward the carriage assembly; actuator means having a movable arm; and linkage means interconnecting the gate and the arm whereby movement of the arm in a first direction initially causes downward movement of the gate away from the front of the first compartment to clear a cartridge in the first compartment and subsequently causes horizontal movement of the gate into the second compartment, out of the path of the carriage assembly transport mechanism.

OBJECTS, FEATURES, AND ADVANTAGES

It is therefore an object of the present invention to minimize the number of storage compartments required for each access port in a document storage system of the type described herein. It is a feature of the present invention to achieve this object by providing a combined transport and gate assembly which is positionable in a single storage compartment, positioned directly below the storage compartment functioning as an access port. An advantage to be derived is that the number of storage compartments required for each access station is minimized. A further advantage is that the number of cards which may be stored in this system is maximized.

It is a further object of the present invention to solve the problems encountered heretofore with complex, delicate transport and gate mechanisms. It is a feature of the present invention to solve these problems by designing a new gate mechanism that is incorporated into the transport assembly. An advantage to be derived is a more reliable and accessible assembly. Another advantage is the elimination of delicate adjustments. A still further advantage is increased reliability of operation.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 1 is a perspective view, partially broken away, of a document storage and retrieval system of the type disclosed in U.S. Pat. No. 3,536,194 showing the carriage assembly, the front and rear storage racks, and two access ports for receipt of the combined transport and gate assembly of the present invention;

FIG. 2 is a highly simplified side elevation view through one of the storage compartments used as an access port showing the relative locations of the transport and gate assembly, the receiving station, and the carriage assembly;

FIG. 3 is a perspective view of a cartridge for use in the system of FIG. 1;

FIG. 4 is a perspective view of the gate subassembly of the present combined transport and gate assembly;

FIG. 5 is a top plan view thereof;

FIG. 6 is a sectional view taken along the line 6—6 in FIG. 5;

FIG. 7 is a sectional view taken along the line 7—7 in FIG. 6; and

DESCRIPTION OF THE PREFERRED EMBODIMENT

Figure 8:
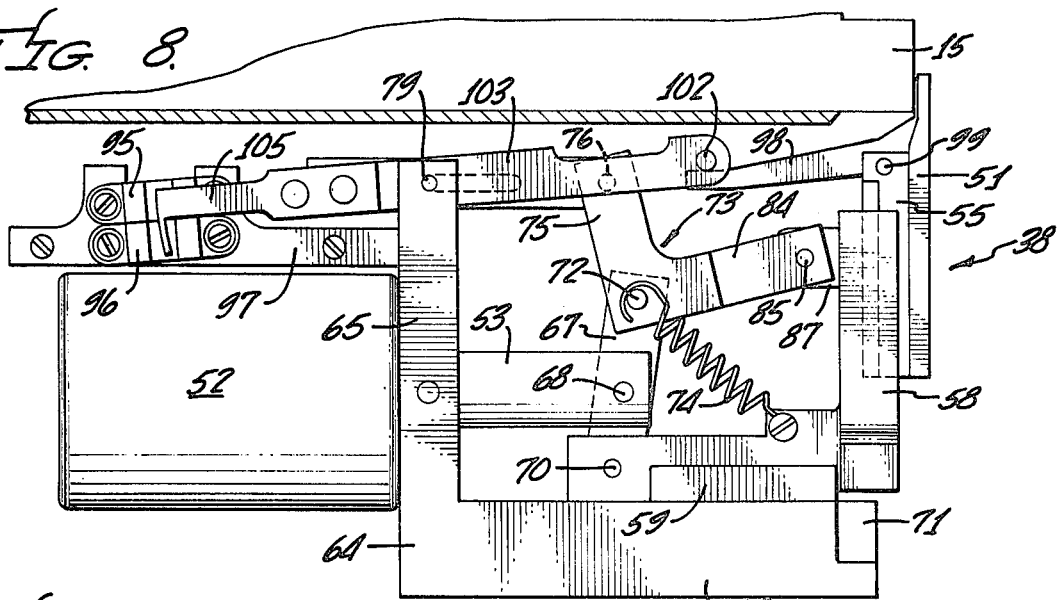
FIGS. 8, 9, and 10 are simplified side elevation views of the gate subassembly of FIG. 4 showing the sequence of operation thereof.

Initially, since the present invention is designed as an improvement to the document retrieval and handling system of the type described in U.S. Pat. No. 3,536,194, reference should be had to such patent for a complete description of the overall document retrieval and handling system. Only so much of such document retrieval and handling system as is required for an understanding of the present invention will be presented here.

One preferred form of a document storage and retrieval system, generally designated 10, embodying the concepts of the present invention is shown more particularly in FIGS. 1, 2, and 3. System 10 includes a pair of vertically disposed, spaced, parallel racks or arrays 11 and 12 housed in an enclosure 13. Each of storage racks 11 and 12 has one thousand individually numbered and addressable storage compartments 14 arranged in a matrix configuration having fifty vertical columns and twenty horizontal rows. Normally positioned in each of storage compartments 14 is a molded plastic magazine or cartridge 15, containing as many as one hundred randomly stored cards (not shown). The cards have notches in their lower edges to permit, in one mode of operation, digital addressing of the cards within a particular cartridge 15.

A servo operated cartridge selector or carriage assembly 16 is provided which travels in a carriage space between storage racks 11 and 12. As used herein, the fronts of the storage racks 11 and 12 are the surfaces facing the carriage space. Carriage assembly 16, in response to digital addresses entered into a keyboard (not shown) of a control console unit (not shown), is selectively positionable opposite any storage compartment 14 for retrieving selected ones of the cartridges 15 normally positioned in the numbered storage compartments, transporting them from the storage racks 11 and 12 to the console unit for processing, and thereafter returning them to their respective storage compartments.

As shown in FIG. 3, cartridges 15 are preferably constructed so as to hold a deck of one hundred edge notched cards, each card being approximately the size of a conventional punch card. Cartridges 15, which preferably are constructed of impact resistant, molded plastic, are open at the top to allow cards to be inserted and withdrawn, and only partially closed at the bottom to support the cards at their opposite bottom corners, as well as to permit a stream of gas to be directed upwardly through the opening 17 against the bottom edges of the cards to separate and raise a selected card from the remainder of the deck of cards.

Each of cartridges 15 is further provided with front and rear extensions 18F and 18R, respectively, having downwardly opening recesses 19F and 19R, respectively. The recesses 19 are adapted to be engaged by tangs 20 (see FIG. 2) associated with the carriage assembly 16 to permit transfer of cartridges 15 between storage compartments 14 and carriage assembly 16.

As can be seen from an inspection of FIGS. 1 and 2, tangs 20 are mounted on a continuous chain 21 which is conducted over rollers 22 and driven by a drive wheel 23. Upon rotation of chain 21, a tang 20 enters one of the recesses 19F in a suitably aligned cartridge 15 to grip front extension 18F thereof, to elevate same to release a detent lug 24 formed in the bottom surface of front extension 18F from a seat in the bottom wall of storage compartment 14, and to subsequently convey the cartridge onto carriage assembly 16. During the reverse operation, tang 20 expels cartridge 15, moving it into one of storage compartments 14.

Carriage assembly 16 has a lower surface 25 on which cartridges 15 rest and side walls 26 for retaining a cartridge 15 therebetween. The complete carriage assembly 16 is vertically movable between a pair of rails 27, so as to be alignable with any of the rows of storage compartments 14. Rails 27 and carriage assembly 16 are movable horizontally on a track 28 for alignment with any of the columns of storage compartments 14.

FIGS. 1 and 2 further show how selected storage compartments 14 may be used to provide access ports 30 for feeding cartridges 15 into and removing cartridges 15 from storage racks 11 and 12. Access ports 30 provide channels through which cartridges 15 may be moved from a receiving station 31 onto carriage assembly 16 for transport to any other storage compartment 14.

According to the present invention, a combined transport and gate assembly, generally designated 35, is positioned in a single storage compartment 14, positioned directly below access port 30, for serving the function of conveying cartridges 15 from receiving station 31 to carriage assembly 16 and vice versa. Because the transport subassembly, generally designated 37, of the combined transport and gate assembly 35 is generally conventional and similar to the transport assembly described in U.S. Pat. No. 3,536,194, it will be described only briefly. The significant difference between the present combined transport and gate assembly 35 and the separate transport and gate assemblies of the beforementioned patent, is that the present assembly is mounted on a single base member 36 which slides into a single storage compartment 14. Both transport subassembly 37 and the gate subassembly, generally designated 38, are mounted on base member 36.

With reference primarily to FIG. 2, the transport subassembly 37, which is effective to transfer cartridges 15 between receiving station 31 and access port 30, includes a platform 39 mounted on base member 36 and having a generally horizontal orientation. A pair of spaced, parallel side walls 40 extend vertically upwardly on opposite sides of platform 39 to constrain the sides of a cartridge 15 moving along platform 39. A conveyor motor 41 having a shaft 42 upon which is mounted a spocket 43 is secured to the side of base member 36. Spocket 43 drives a chain 44 which is connected to another spocket (not shown) mounted on a shaft 45. Mounted on the opposite ends of shaft 45 are a pair of drums 46 which are positioned on opposite sides of platform 39. A simimilar pair of drums 47 are mounted on the ends of a shaft (not shown) which is supported by platform 39 so that drums 47 are positioned on opposite sides of platform 39. A pair of conveyor belts 48 extend around respective pairs of drums 46 and 47 whereby conveyor belts 48 extend across the top surface of platform 39, adjacent the opposite side edges thereof.

As explained more fully in the beforementioned U.S. Pat. No. 3,536,194, it can be seen that activation of motor 41 causes movement of conveyor belts 48 along the top surface of platform 39, through the intermediary of spocket 43, chain 44 and drums 46 and 47. In this manner, conveyor belts 48 are operative to transfer a cartridge 15 between receiving station 31 and access port 30.

Before describing in detail the construction of gate subassembly 38 of combined transport and gate assembly 35, a brief description of the operation of document storage and retrieval system 10 is provided. Prior to extraction of a cartridge 15 from its associated storage compartment 14, the bottom surface of cartridge 15 is in contact with and supported by the upper surface comprising the bottom of storage compartment 14. In addition, detent lug 24 is seated in a slot in the bottom surface to accurately locate the position of each cartridge 15 in its associated storage compartment 14.

Assuming that tangs 20 on carriage assembly 16 are in their normal positions, as shown in FIG. 2, that carriage assembly 16 is located opposite the storage compartment 14 in which a cartridge 15 is located, and that surface 25 of carriage assembly 16 is flush with the bottom surface of storage compartment 14, the extraction cycle is initiated by having drive wheel 23 rotate chain 21 and tangs 20. If a cartridge 15 is to be extracted from storage rack 12, chain 21 will be rotated in a counterclockwise direction as viewed in FIG. 2. If a cartridge 15 is to be extracted from storage rack 11, chain 21 will be driven in a clockwise direction as viewed in FIG. 2. In either event, one of the two tangs 20 engages front recess 19F of cartridge 15 to start movement thereof.

When one of tangs 20 initially engages recess 19F, tang 20 is angled at approximately 45° to the horizontal. With tang 20 so oriented, the force exerted by the tang on front cartridge extension 18F is such as to have substantially equal components in both the vertical and horizontal directions. The vertical component is effective to lift front cartridge extension 18F upwardly, thereby disengaging detent lug 24 from the cartridge locating slot. The horizontal component of force exerted by tang 20 on front cartridge extension 18F is effective to slide cartridge 15 toward carriage assembly 16, extracting it from its storage compartment 14. Continued motion of tang 20 transfers cartridge 15 to a position on lower surface 25 of carriage assembly 16.

At this point, the extraction of a cartridge 15 from its associated storage compartment 14 is complete. Accordingly, carriage assembly 16 may be moved to another storage compartment 14 or to one of access ports 30. Transfer of cartridge 15 to any storage compartment 14 works in essentially the same way as just described in the sense that tang 20 remains engaged with one of the recesses in cartridge 15 and is effective in moving the cartridge horizontally upon movement of chain 21. Continued movement of chain 21 causes tang 20 to ultimately move downwardly to disengage the extension in the cartridge. The same procedure as just described occurs when a cartridge 15 is moved between carriage assembly 16 and access port 30.

As described in the beforementioned U.S. Pat. No. 3,536,194, it is necessary to provide a gate assembly for operation in connection with access port 30. That is, as described previously, transport subassembly 37 is effective in transferring a cartridge 15 from receiving station 31 into access port 30 where it may be extracted therefrom onto carriage assembly 16 for subsequent transfer to its associated storage compartment 14. Because of the use of a conveyor belt 48 to transfer a cartridge 15 from receiving station 31 to access port 30, it is not possible for transport subassembly 37, in and of itself, to accurately locate a cartridge 15 in access port 30. If, for example, cartridge 15 is not moved far enough into access port 30, it may not be in position to be grasped by tang 20 for transfer onto carriage assembly 16. On the other hand, if cartridge 15 is moved too far so that it extends beyond the front of access port 30, it is in position to be contacted by carriage assembly 16 as it moves into position adjacent access port 30, and this may damage cartridge 15 or carriage assembly 16, or both.

To prevent this from occurring, U.S. Pat. No. 3,536,194 discloses a gate assembly positioned in an empty storage compartment located directly above the access port. The overall function of the gate assembly is to properly align and locate in the access port a cartridge which has been transferred from the receiving station by the transport assembly prior to engagement thereof by tang 20 of carriage assembly 16. According to the present invention, gate subassembly 38 is positioned in the same storage compartment 14 as transport subassembly 37 and is made an integral part thereof.

Referring now to FIGS. 2 and 4–7, there is shown the construction of gate subassembly 38. As can be seen in FIG. 2, gate subassembly 38 is positioned in the storage compartment 14 directly below access port 30, adjacent the front thereof. Gate subassembly 38 comprises a vertically oriented cartridge stop or gate member 51 which extends upwardly from the leading edge of gate subassembly 38, along the front of one of storage racks 11 or 12, so as to extend in front of access port 30 in a position to intercept either the front or rear extension 18F or 18R, respectively, of a cartridge 15 moving through access port 30 to block movement thereof into or out of access port 30. This is the position of gate subassembly 39 shown in FIGS. 2 and 4–7. As seen in FIG. 2, in such position of cartridge stop 51, it is not only directly in the path of a cartridge 15, but it is also in the path of tang 20 of carriage assembly 16. Therefore, when it is desired to release a cartridge 15 located in access port 30 for extraction therefrom by carriage assembly 16, it is necessary for cartridge stop 51 to first move vertically downwardly to clear cartridge 15 and to subsequently move horizontally towards transport subassembly 37 to clear tang 20 to carriage assembly 16. During retraction, the vertical movement must precede the horizontal movement so that the vertical movement does not move cartridge 15 rearwardly in access port 30 out of position where it can be gripped by tang 20.

Generally speaking, this combined movement of cartridge stop 51 is controlled by an actuator means, specifically an electrical solenoid 52, having a movable armature 53. Armature 53 is connected by means of a linkage to cartridge stop 51 whereby movement of armature 53 to the left, as viewed in FIGS. 2 and 4–6, first causes downward movement of stop 51 to clear a cartridge 15 in access port 30 and then causes horizontal movement of cartridge stop 51 towards solenoid 52 to clear carriage assembly tang 20.

More specifically, cartridge stop 51 is secured by means of screws 54 to a slide member 55 which has a pair of sidewardly extending flanges 56. Flanges 56 extend into opposed channels 57 in a pair of vertically extending, spaced arms 58 which are part of a generally L-shaped anchor block 59. Since flanges 56 are freely slideable in channels 57, anchor block 59 supports cartridge stop 51 for vertical movement relative thereto. Anchor block 59 has a horizontally extending section 60 which includes a pair of sidewardly extending flanges 61 which extend into channels 62 in the horizontal leg 63 of a generally L-shaped base member 64. Leg 63 of base member 64 is connectable to base member 36 and provides the means of attachment of gate subassembly 38 to the combined transport and gate assembly 35. The vertically extending leg 65 of base member 64 supports solenoid 52 to permit movement of armature 53 in a generally horizontal direction, parallel to leg 63.

The free end of armature 52 has a slot 66 therein for receipt of a gate lever 67. A pin 68 connected to armature 53 and extending through a hole in gate lever 67 causes pivoting of gate lever 67 upon movement of armature 53. The lower end of gate lever 67 is positioned within a machined slot 69 in section 60 of anchor block 59. A pin 70 secures the lower end of gate lever 67 in slot 69. It should be noted that the shape of slot 69 is such that gate lever 67 may be moved between a forwardly sloping position, shown in FIG. 6, and a vertical position shown in FIG. 9. That is, upon retraction of armature 53, gate lever 67 cannot be rotated within slot 69 beyond a vertical position.

The upper end of gate lever 67 is connected by means of a pivot pin 72 to the center of an L-shaped lever 73. Pin 72 is also connected to one end of a spring 74, the other end of which is connected to anchor block 59. Spring 74 is, therefore, effective in biasing gate lever 67 in the position shown in FIG. 6. The free end of one leg 75 of lever 73 is connected via a pivot pin 76 to one end of a slide bar 77 having a slot 78 therein, through which extends a pin 79 connected to leg 65 of base member 64. Pin 79 and slot 78 permit horizontal movement of slide bar 77 relative to leg 65 of base member 64. Slide bar 77 is biased in its forward position by means of a spring 80 connected between pin 79 in the upper end of leg 65 of base member 64 and a pin 82 connected to the other end of slide bar 77.

The free end of the other leg 84 of lever 73 includes a pin 85 which extends into a slot 86 in a rearwardly extending clevis 87 which is an integral part of slide member 55. Therefore, clockwise rotation of lever 73, as will be explained more fully hereinafter, lowers cartridge stop 51 until gate lever 67 terminates movement at the vertical position.

The remaining element of gate subassembly 38 is a spring 89 which is connected between a pin 90 secured to leg 63 of base member 64 and a pin 91 secured to section 60 of anchor block 59. Thus, spring 89 biases anchor block 59 forwardly. It should also be noted that there is a differential tension in springs 74 and 89. That is, spring 89 has a greater tension than spring 74 so that spring 74 will stretch prior to any stretching of spring 89.

Figure 9:
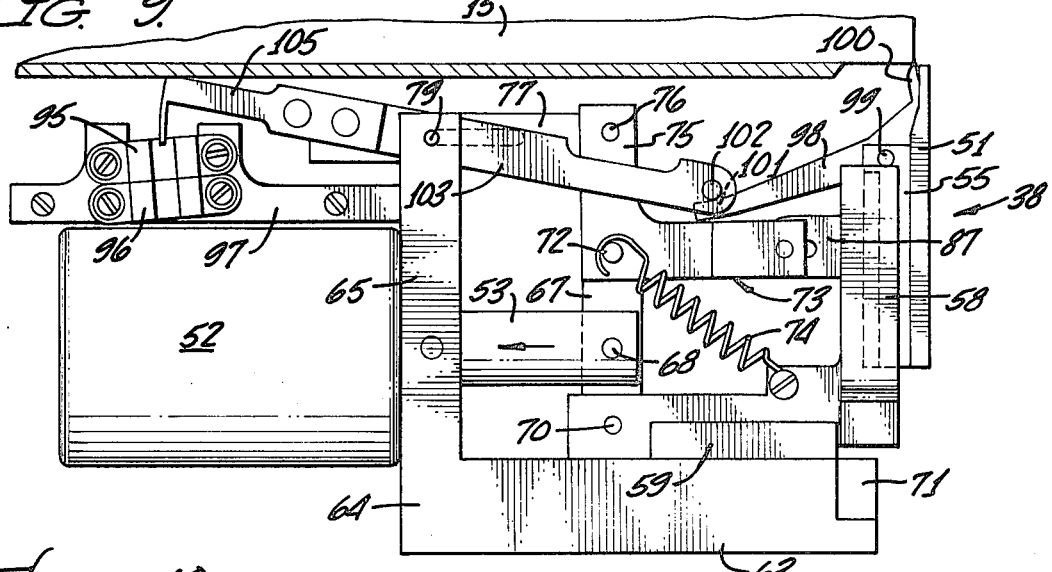
Figure 10:
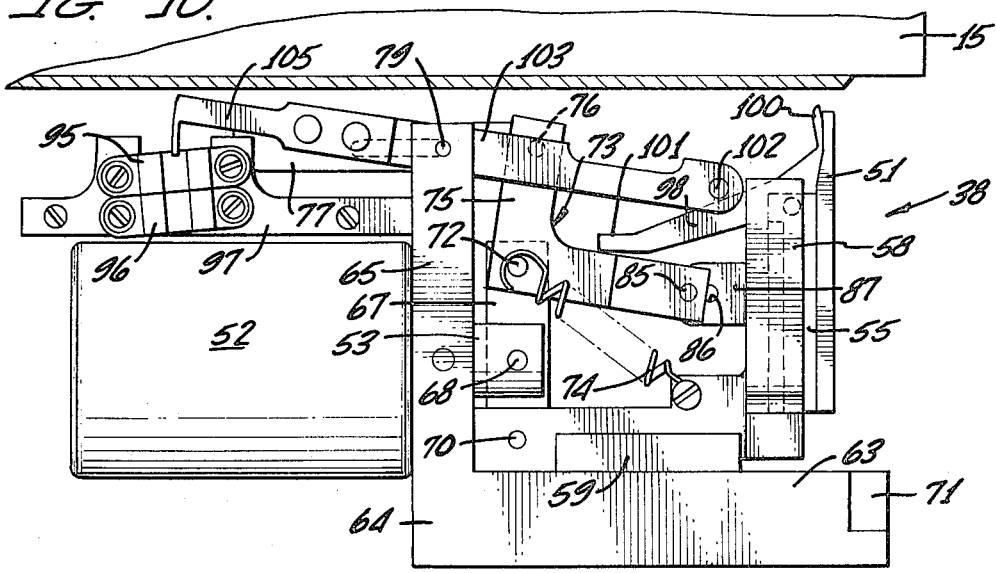

The operation of the just described components of gate subassembly 38 may be best understood with reference to FIGS. 8, 9 and 10 which show the sequence of operation. More specifically, FIG. 8 shows the position of gate subassembly 38 after it has intercepted a cartridge 15 which has been moved from receiving station 31 into access port 30. As explained previously, cartridge stop 51 must first move downwardly to clear cartridge 15 and then horizontally to clear carriage assembly tangs 20. The vertical movement preceding the horizontal movement is accomplished by means of the differential tension in springs 74 and 89. Initially, spring 89 biases anchor block 59 to the right, as viewed in FIG. 8, and spring 74 biases gate lever 67 in its fully clockwise direction, also as viewed in FIG. 8.

To retract cartridge stop 51, electrical solenoid 52 is energized and armature 53 is pulled back into solenoid 52. The initial movement of armature 53, from the position shown in FIG. 8 to the position shown in FIG. 9, moves gate lever 67 in a counterclockwise direction towards its vertical position by means of the interconnection caused by pin 68. As mentioned previously, gate lever 67 pivots around pin 70 in section 60 of anchor block 59. Lever 67 rotates by overcoming the spring tension of spring 74. At the same time, spring 80 retains slide bar 77 in its forwardmost position, holding pin 76 connected to the end of leg 75 of lever 73 stationary. As a result, lever 73 also rotates with lever 67, lever 73 rotating in a clockwise direction about pin 76. Since lever 73 is connected through a sliding pin 85 in slot 86 in clevis 87, clevis 87, slide member 55, and cartridge stop 51 are lowered. This is the position shown in FIG. 9 and the initial movement of cartridge stop 51 is exclusively in the vertical direction until movement of gate lever 67 terminates at the vertical position. Until this time, anchor block 59 is prevented from moving horizontally by means of the increased tension of spring 89.

On the other hand, continued movement of the electrically energized solenoid armature 53 from the position shown in FIG. 9 to the position shown in FIG. 10, and the resultant force against gate lever 67, which is now vertical and locked by containment in slot 69 of anchor block 59, will overcome the tension in spring 89 and cause anchor block 59 to move horizontally, with flanges 61 sliding through channels 62 in horizontal leg 63 of base member 64. This horizontal movement of anchor block 59 displaces slide bar 77 horizontally by overcoming the tension of spring 80. The increase in spring 80 tension will apply a force to lever 73 and in turn to cartridge stop 51 to hold it in the vertically retracted position.

Horizontal movement of anchor block 59 is limited by solenoid armature 53 bottoming out in electrical solenoid 52. Continued energizing of electrical solenoid 52 will maintain cartridge stop 51 in the retracted position vertically to clear any cartridge 15 movement in access port 30 and horizontally to clear any rotational movement of carriage assembly tangs 20.

Deenergizing electrical solenoid 52 will, by spring tension, return cartridge stop 51 horizontally, then vertically, to the cartridge stop position in access port 30, as shown in FIG. 8. That is, deenergized, solenoid armature 53 will release the force applied on gate lever 67 and allow the tension in spring 89 to move anchor block 59 and its attached parts horizontally to the static position against a shoulder 71 made integral with base member 64. The horizontal movement of gate lever 67 acting on lever 73 displaces slide bar 77 horizontally until the left hand edge of slot 78 engages pin 79. Tension spring 80 through slide bar 77 and pivot pin 76 applies a clockwise torque on lever 73, holding cartridge stop 51 in its vertically retracted position. When anchor block 59 comes to rest against shoulder 71, gate lever 67, acted upon by the tension of spring 74, rotates clockwise until restrained by pin 70 and slot 69 in anchor block 59. The clockwise rotation of gate lever 67, in turn, rotates lever 73 through common pivot pin 72. Rotation of lever 73 in a counterclockwise direction about pivot pin 76 in slide bar 77 acts on pin 85 and slotted clevis 87 of cartridge stop 51, raising it vertically to the static or stop position.

Referring now to FIGS. 4, 5, and 8–10, a pair of photo-optical sensors 95 and 96 are mounted above solenoid 52 by means of a bracket 97 connected to leg 65 of base member 64. Sensors 95 and 96 are part of gate subassembly 38 and are operative to sense, through a trigger and lever linkage, the presence or the absence of a cartridge 15 in access port 30 at the cartridge stop position. That is, a trigger linkage 98 is connected by means of a pivot pin 99 to slide member 55. One end 100 of trigger linkage 98 extends vertically adjacent cartridge stop 51, at the back thereof, in a position to be intercepted by a cartridge 15 in access port 30. The other end 101 of trigger linkage 98 has a pin 102 resting thereon, pin 102 being connected to one end of a lever 103, which is mounted for pivotal movement by means of pin 79 extending across a slot in leg 65 of base member 64. Connected to the other end of lever 103 is a sensor trigger 105 which is adapted to move within sensors 95 and 96.

In operation, the normal rest position of trigger linkage 98 is the position shown in FIGS. 4 and 6. In this position, end 101 of trigger linkage 98, being longer than end 100 thereof, is held downwardly by the force of gravity. The end of lever 103 which has pin 102 connected thereto, is also heavier so that lever 103 is also biased in a clockwise position with pin 102 resting on end 101 of trigger linkage 98. At this time, sensor trigger 105, attached to trigger lever 103, is activating sensor 95 indicating that no cartridge 15 is present at cartridge stop 51 in access port 30.

When a cartridge 15 enters access port 30 from receiving station 31, via transport subassembly 37, it comes to rest against cartridge stop 51, as shown in FIG. 8, and also actuates the cartridge sensing mechanism. That is, when either the front or rear extension 18F or 18R, respectively, of a cartridge 15 engages end 100 of trigger linkage 98, it rotates it in a clockwise direction around pin 99. Trigger linkage 98 simultaneously rotates trigger lever 103 in a counterclockwise direction around pivot pin 79, lowering sensor trigger 105. Trigger lever 103, through sensor trigger 105, now activates sensor 96 to indicate that a cartridge 15 is present at the gate cartridge stop position.

It will be noted by comparison of FIGS. 8, 9 and 10 that upon retraction of cartridge stop 51, there is movement of lever 103 and corresponding movement of sensor trigger 105. In fact, sensor trigger 105 is elevated so that it is no longer activating either sensor 95 or 96. This information can either be utilized or discarded by the control console since the primary function of sensors 95 and 96 is to indicate the presence or absence of a cartridge 15 in access port 30 prior to retraction of cartridge stop 51.

It can therefore be seen that according to the present invention, there is disclosed a combined transport and gate assembly 35 for a document storage and retrieval system 10 which solves the problems associated with the separate transport and gate mechanisms previously used. With the present invention, the transport and gate subassemblies 37 and 38, respectively, are integrated into a single assembly 35, which is entirely positionable within a single storage compartment 14, positioned immediately below access port 30, thereby reducing the number of storage compartments 14 for each access port 30 to two, as opposed to five in the previous design. This is accomplished by modifying the transport attachment to the storage pocket structure, thereby eliminating the use of one pocket for attachments and by designing a new gate subassembly 38 that is incorporated into the transport subassembly, thereby eliminating the use of two storage pockets, one for the previous gate assembly and one for the gate assembly attachment. The design integration of transport and gate subassemblies 37 and 38 provides a more reliable and accessible assembly for operation and maintenance. Furthermore, the present transport and gate assembly 35 incorporates photo-optical sensors 95 and 96 to determine the presence of a cartridge 15 in access port 30, eliminating the delicate adjustments previously required and providing the inherent reliability of solid state components and circuits.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a document storage system of the type including a storage rack having a plurality of individual storage compartments, each of said compartments normally having positioned therein a cartridge holding a plurality of cards or the like, at least a first one of said compartments being empty and functioning as an access port for feeding cartridges into and removing cartridges from said storage rack, and a carriage assembly which travels on one side of said rack for transferring cartridges between said access port and the other storage compartments, said carriage assembly including a transport mechanism for moving cartridges thereon to and thereoff of, an improved gate assembly positionable in a second empty storage compartment immediately below said first compartment comprising:

a mechanical stop extending upwardly from the leading edge of said gate assembly, on said one side of said rack, in front of said first compartment, positioned to intercept the leading lower edge of a cartridge to block movement thereof into or out of said first compartment;

actuator means having a movable arm; and means interconnecting said stop and said arm for moving said stop into said second compartment to clear a cartridge in said first compartment and said carriage assembly transport mechanism.

2. In a document storage system according to claim 1, an improved gate assembly wherein said linkage means moves said stop vertically downwardly and horizontally rearwardly.

3. In a document storage system according to claim 2, an improved gate assembly wherein said vertical movement of said stop precedes said horizontal movement thereof.

4. In a document storage system according to claim 1, 2, or 3, an improved gate assembly further comprising:

a cartridge presence sensor mounted on said stop for providing a signal output indicating that said stop has intercepted a cartridge moving in said first compartment toward said carriage assembly.

5. In a document storage system according to claim 4, an improved gate assembly wherein said cartridge presence sensor comprises:

a lever mounted on said stop, one end of said lever being positioned to be intercepted by a cartridge moving in said first compartment toward said carriage assembly;

at least one photo-optical sensor; and means operatively connected to the other end of said lever for activating said photo-optical sensor.

6. In a document storage system of the type including a storage rack having a plurality of individual storage compartments, each of said compartments normally having positioned therein a cartridge holding a plurality of cards or the like, at least a first one of said compartments being empty and functioning as an access port for feeding cartridges into and removing cartridges from said storage rack, and a carriage assembly which travels on one side of said rack for transferring cartridges between said access port and the other storage compartments, said carriage assembly including a transport mechanism for moving cartridges thereonto and thereoff of, an improved gate assembly positionable in a second empty storage compartment immediately below said first compartment comprising:

- a vertically-oriented gate extending upwardly from the leading edge of said gate assembly, on said one side of said rack, in front of said first compartment, positioned to intercept the leading lower edge of a cartridge to block movement thereof into or out of said first compartment;
- actuator means having a movable arm; and
- linkage means interconnecting said gate and said arm whereby movement of said arm in a first direction causes downward movement of said gate away from said front of said first compartment to clear a cartridge in said first compartment and horizontal movement of said gate into said second compartment to clear said carriage assembly transport mechanism.

7. In a document storage system according to claim 6, an improved gate assembly wherein said downward movement of said gate precedes said horizontal movement thereof.

8. In a document storage system according to claim 6 or 7, an improved gate assembly wherein movement of said arm in a second, opposite direction causes horizontal movement and then vertical movement of said gate to said position blocking movement of a cartridge into or out of said access port.

9. In a document storage system according to claim 6 or 7, an improved gate assembly further including:

- a cartridge presence sensor mounted on said gate for providing a signal output indicating that said gate has intercepted a cartridge moving in said first compartment towards said carriage assembly.

10. In a document storage system according to claim 9, an improved gate assembly wherein said cartridge presence sensor comprises:

- a lever mounted on said gate, one end of said lever being positioned to be intercepted by a cartridge moving in said first compartment toward said carriage assembly;
- at least one photo-optical sensor; and
- means operatively connected to the other end of said lever for activating said photo-optical sensor.

11. In a document storage system of the type including a storage rack having a plurality of individual storage compartments, each of said compartments normally having positioned therein a cartridge holding a plurality of cards or the like, at least a first one of said compartments being empty and functioning as an access port for feeding cartridges into and removing cartridges from said storage rack, and a carriage assembly which travels on one side of said rack for transferring cartridges between said access port and the other storage compartments, said carriage assembly including a transport mechanism for moving cartridges thereon to and thereoff of, a combined transport and gate assembly positionable in a second empty storage compartment immediately below said first compartment comprising:

- a base member positionable in said second storage compartment;
- a transport subassembly mounted on said base member, adjacent the other side of said rack, said transport subassembly including:
- conveyor means for conveying cartridges from a receiving station into said access port; and
- a gate subassembly mounted on said base member, adjacent said one side of said rack, said gate subassembly comprising:
- a mechanical stop extending upwardly from the leading edge of said gate subassembly, on said one side of said rack, in front of said first compartment, positioned to intercept the leading lower edge of a cartridge to block movement thereof into or out of said first compartment;
- acuator means having a movable arm; and
- means interconnecting said stop and said arm for moving said stop into said second compartment to clear a cartridge in said first compartment and said carriage assembly transport mechanism.

12. In a document storage system according to claim 11, a combined transport and gate assembly wherein said interconnecting means moves said stop vertically downwardly and horizontally rearwardly.

13. In a document storage system according to claim 12, a combined transport and gate assembly wherein said vertical movement of said stop precedes said horizontal movement thereof.

14. In a document storage system according to claim 13, a combined transport and gate assembly wherein movement of said arm in a first direction causes said vertically downward and horizontally rearward movement of said stop and wherein movement of said arm in a second, opposite direction causes horizontal movement and then vertical movement of said stop to said position blocking movement of a cartridge into or out of said access port.

15. In a document storage system according to claim 11, 12 or 13, a combined transport and gate assembly further comprising:

- a cartridge presence sensor mounted on said stop for providing a signal output indicating that said stop has intercepted a cartridge moving in said first compartment toward said carriage assembly.

16. In a document storage system according to claim 15, a combined transport and gate assembly wherein said cartridge presence sensor comprises:

- a lever mounted on said stop, one end of said lever being positioned to be intercepted by a cartridge moving in said first compartment toward said carriage assembly;
- at least one photo-optical sensor; and
- means operatively connected to the other end of said lever for activating said photo-optical sensor.

* * * * *